US008521820B2

(12) United States Patent
McQuaide, Jr. et al.

(10) Patent No.: US 8,521,820 B2
(45) Date of Patent: Aug. 27, 2013

(54) SYSTEM, METHODS, AND COMPUTER PROGRAM PRODUCTS FOR VIRTUAL PRESENCE SERVICE TRIGGERED WHEN CONSUMING CONTENT

(75) Inventors: Arnold Chester McQuaide, Jr., Berkeley Lake, GA (US); Nicholas Steven Huslak, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 858 days.

(21) Appl. No.: 11/867,493

(22) Filed: Oct. 4, 2007

(65) Prior Publication Data
US 2009/0094330 A1 Apr. 9, 2009

(51) Int. Cl.
*H04L 29/06* (2006.01)

(52) U.S. Cl.
USPC ........... 709/205; 709/206; 709/207; 709/208; 709/204; 709/203

(58) Field of Classification Search
USPC ............... 709/205, 206, 207, 208, 204, 203
See application file for complete search history.

(56) References Cited

U.S. PATENT DOCUMENTS

| 7,159,178 | B2 | 1/2007 | Vogt et al. | |
|---|---|---|---|---|
| 2005/0289627 | A1* | 12/2005 | Lohman | 725/109 |
| 2008/0082550 | A1* | 4/2008 | Ahopelto et al. | 707/10 |
| 2008/0147681 | A1* | 6/2008 | Kiko | 707/100 |
| 2008/0158373 | A1* | 7/2008 | Chu | 348/211.14 |
| 2011/0047487 | A1* | 2/2011 | DeWeese et al. | 715/758 |

* cited by examiner

*Primary Examiner* — Kenny Lin
*Assistant Examiner* — Abdelnabi Musa
(74) *Attorney, Agent, or Firm* — Cantor Colburn LLP

(57) ABSTRACT

System, methods, and computer program products for a virtual presence service are provided. The virtual presence service includes configuring a virtual presence community and registering a user for the virtual presence community. Also, the virtual presence service includes providing a filter to detect triggering events corresponding to the virtual presence community and initiating group communications in response to detecting the triggering event.

18 Claims, 5 Drawing Sheets

Virtual Presence Community

| | |
|---|---|
| Name: | Atlanta Braves Baseball Club |
| Triggering Event: | Atlanta Braves Baseball Game |
| Members: | User 1, User 2, User 3, User 4 |
| Communication Method: | Text Chat |
| Quorum: | 2 |

Virtual Presence Data Server Status Table

| Virtual Community = Atlanta Braves Baseball Club | | |
|---|---|---|
| Triggering Event = Braves Game | Quorum = 2 | |
| Members | Status | |
| | Virtual Presence | Social Networking |
| User 1 | Present | |
| User 2 | Present | Accepted |
| User 3 | | |
| User 4 | Present | Accepted |

300

SYSTEM, METHODS, AND COMPUTER PROGRAM PRODUCTS FOR VIRTUAL PRESENCE SERVICE TRIGGERED WHEN CONSUMING CONTENT

BACKGROUND

Exemplary embodiments relate generally to virtual presence service, and more particularly, to systems, methods, and computer program products for providing the virtual presence service.

Television (TV) viewing is in some ways an isolating experience. Viewers are often alone or in a small group. However, television viewing may also be the basis for social gathering, as people often discuss last night's game or AMERICAN IDOL program around the water cooler or in the car pool.

It would be desirable for television viewing not to be isolating and to have a way for television viewing to lead to a social networking experience.

BRIEF SUMMARY

Exemplary embodiments include a virtual presence service. The virtual presence service includes configuring a virtual presence community and registering a user for the virtual presence community. Also, the virtual presence service includes providing a filter to detect triggering events corresponding to the virtual presence community and initiating communications in response to detecting the triggering event.

Additional exemplary embodiments include a virtual presence service system. The system includes a virtual presence server configured to maintain a virtual presence community, and a VP filter agent. The virtual presence server provides a filter to the VP filter agent via the network. The filter monitors for triggering events corresponding to the virtual presence community, and the virtual presence server receives the triggering event information from the VP filter agent in response to the filter detecting the triggering event. The virtual presence server initiates communications with a user and the virtual presence community via a network.

Further exemplary embodiments include a computer program product, which is tangibly embodied on a computer readable medium, for a virtual presence service. The computer program product includes instructions for causing a computer to execute a method. The instructions for the method include configuring a virtual presence community and registering a user for the virtual presence community. The instructions also include providing a filter to detect triggering events corresponding to the virtual presence community and initiating communications in response to detecting the triggering event.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 2 illustrates a non-limiting example of a virtual presence community in accordance with exemplary embodiments;

The detailed description explains the exemplary embodiments, together with advantages and features, by way of example with reference to the drawings.

DETAILED DESCRIPTION OF EXEMPLARY EMBODIMENTS

Exemplary embodiments may provide the opportunity for instant or near-immediate "social networking" among those who are simultaneously viewing or listening to the same content. Exemplary embodiments are based on the concept of "virtual presence" (VP) as discussed herein.

The concept of presence often is used to refer to people who are "on-line" at their personal computers (PCs), signed-on to an instant messaging (IM) service, have their cell phones turned on, or are otherwise immediately available for communication. Virtual presence, a new term in the exemplary embodiments, refers to a group of people who are simultaneously consuming real time content, watching a ball game either at the stadium or in person, watching the same broadcast TV program, or listening to the same concert—in person or via broadcast. Such a group of people is designated herein as a virtual presence community. Exemplary embodiments allow the people in a virtual presence community to participate in instant or near-immediate social networking, which is the establishment and usage of a separate or the same communications channel which is used by participants in the virtual community, typically to communicate about their shared experience. As a non-limiting example, if a group of friends care to establish an "American Idol" VP community, they could communicate about their shared experience on a conference call in real time in accordance with exemplary embodiments.

In exemplary embodiments, this communication could be by text on the TV screen, text on a separate handheld device such as a cell phone or personal digital assistant (PDA), or voice on a voice conference call. In accordance with exemplary embodiments, the isolation of TV viewing could be replaced by the participation in virtual communities with the resultant social networking experiences.

In exemplary embodiments, the VP community can be linked to the simultaneous consumption of content. As non-limiting examples, Internet protocol TV (IPTV) devices or set top boxes with Internet connectivity could transmit, when authorized, virtual presence information to a central server on behalf of a subscriber. The central server may control the establishment of a VP community list, such as a chat session or a conference call among members of the VP community in accordance with exemplary embodiments.

Figure 1:
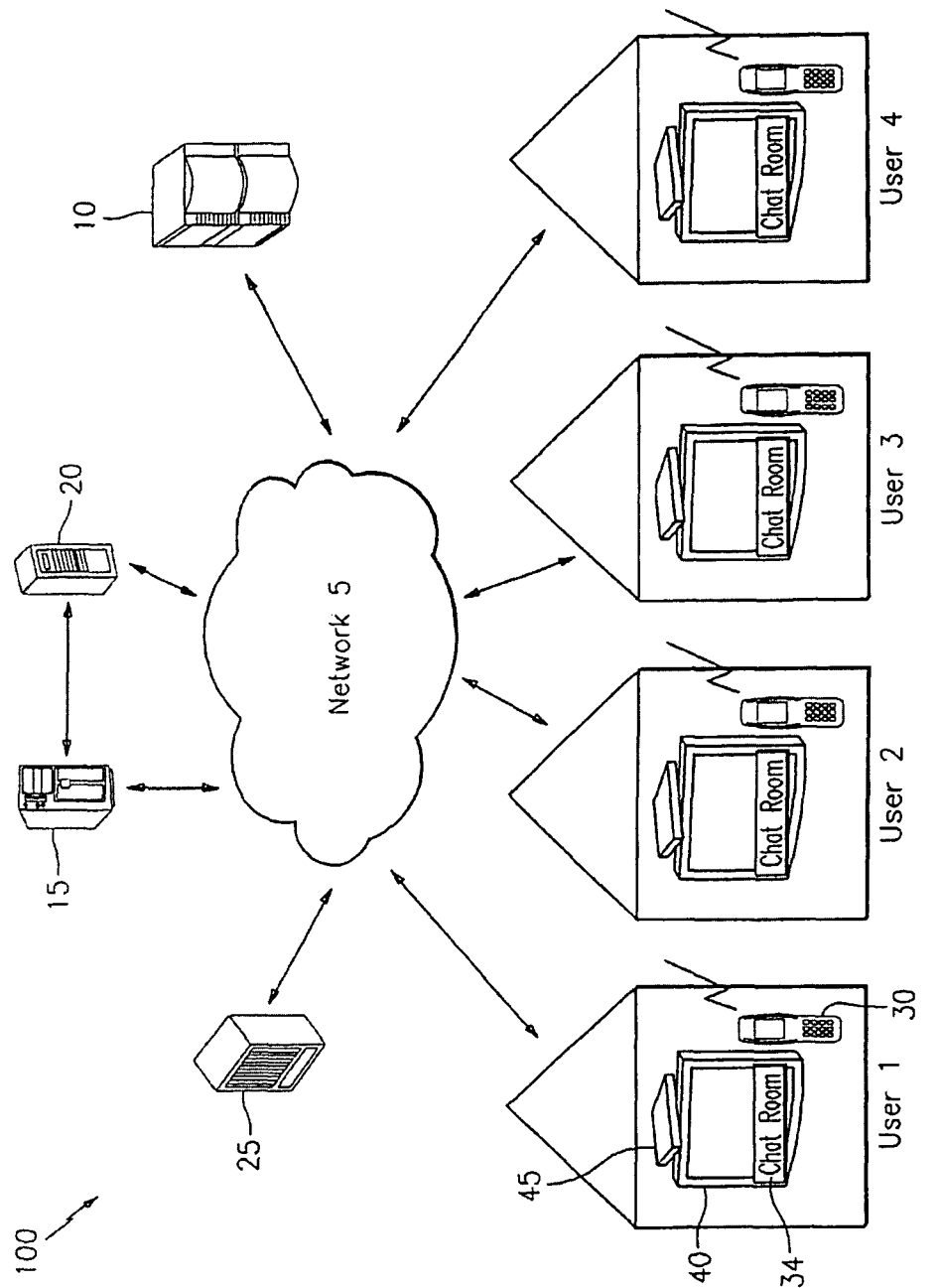
FIG. 1 illustrates a system for implementing a virtual presence service in accordance with exemplary embodiments.

FIG. 1 illustrates a system 100 for implementing a virtual presence service in accordance with exemplary embodiments. A network 5 may provide connectivity between the various VP service components involved in establishing virtual presence communities, and the network 5 may be, e.g., an Internet protocol (IP) network. It is understood that the network 5 includes all the components (hardware and software) necessary to operate the VP service as discussed herein.

In exemplary embodiments, the VP service may work in conjunction with a content provider, which provides content that forms the basis (triggering event) for the VP communities. As a non-limiting example, this content provider may be a broadcast media source 10 in FIG. 1.

The system 100 may include a VP data server 15 that maintains a global list of all VP communities (and the members in each VP community as well as other data specific to each VP community) managed by a VP application server 20. Also, the global list of the VP communities may be managed by another server. According to exemplary embodiments, the VP data server 15 maintains the current status of the "virtual presence" of all such VP communities, as discussed herein. The VP data server 15 may be co-located with one or more of the other VP service components.

A The VP application server 20 may manage user registrations and service invocations. The VP application server 20 receives notifications of triggering events from the VP data server 15, and in response to the notification of triggering events, sets up the social networking required for the VP community that is associated with each triggering event. As non-limiting examples, the social networking communication method may be by a phone 30, text chat room 35, or any other communication medium.

The virtual presence service provider (e.g., AT&T) may utilize the service and/or equipment of a communication service provider to provide the connectivity that is required for the various VP communities. As non-limiting examples, two illustrations of communications for social networking are provided, which include a conference call between members of a VP community using a conference bridge server 25 via the phone 30 (e.g., a landline telephone or a cellular phone) and an on-screen text chat room, such as the chat room 35 displayed on an IPTV 40.

In exemplary embodiments, a VP filter agent performs metadata filtering that monitors user activity associated with content provided by the content provider (e.g., the broadcast media source 10). As non-limiting examples, metadata filtering may be implemented on a set top box 45. Additionally, as non-limiting examples, the metadata filtering may be implemented on another device that is local to the user, and/or on the broadcast media source 10. According to exemplary embodiments, the metadata filtering examines data associated with content delivery (e.g., the content that the user is watching on the IPTV 40) to detect the common viewing experience (i.e., the triggering event) that is of common interest to the VP community.

Figure 3:
FIG. 3 illustrates a non-limiting example of a virtual presence server table in accordance with exemplary embodiments.

The metadata filtering component (e.g., on the set top box 45) may receive instructions from the VP application server 20 on triggering events that are to be reported to the VP data server 15. This metadata filtering is performed on the basis of metadata associated with programming sent via the broadcast media source 10. The metadata may involve a channel number, program subject, type of event, presence of a particular star/personality, particular sports team (Penn State football), particular event (e.g., the Super Bowl), and so forth. This type of user behavior metadata filtering performed by the VP filter agent allows the VP communities to be independent of program channel, time zone, and other restrictions. Based on reported triggering events from the VP filter agent, the VP data server 15 may maintain a table for each VP community showing the list of users that are members of the VP community along with an indication of whether each member is "virtually present" at that moment. FIG. 3 illustrates a non-limiting example of a virtual presence server table 300 in accordance with exemplary embodiments.

In exemplary embodiments, as the user consumes content via the broadcast media source 10, he or she may receive invitations to join in social networking with the applicable VP Community once other members are virtually present (e.g., viewing and/or listening to the content). These invitations can be delivered via on-screen messaging, on separate handheld devices, on a PC/laptop, or in some other way. The user can then accept or reject the invitation to join in the social networking experience.

Referring to FIG. 1, various users 1, 2, 3, 4 are connected to the network 5 with content, signaling, and social networking links as needed in exemplary embodiments. The users 1, 2, 3, 4, may each have the IPTV 40 and the set top box 45. The users 1, 2, 3, 4 may subscribe to existing VP communities and/or create new VP communities on, e.g., the VP application server 20. Members of the VP community may choose to employ a communication method such as the phone 30 and/or the chat room 35 to communicate with one another in the VP community.

In exemplary embodiments, the users 1, 2, 3, 4 can set up their user profiles utilizing "back office" capabilities available on, e.g., the VP application server 20 using a PC and the Internet (e.g., the network 5), telephone conversations with a service provider agent, or any other communications means. For each user 1, 2, 3, 4, these user profiles include the list of one or more VP communities in which each user selects to become a member, according to exemplary embodiments. As an option, users 1, 2, 3, 4 may also include a buddy list indicating other users that they would like to have as members of their VP communities (if/when conditions are met that define the VP community).

As discussed herein, a VP community may require that a "quorum" be met before invitations are sent out to members for social networking. The social networking can take many forms, including text chat in the text chat room 35 and audio chat on landline or mobile phones 30 (e.g., via a conference call such as "would you like to join the Penn State Club chat bridge during the game?").

FIG. 2 illustrates a non-limiting example of a virtual presence community table in accordance with exemplary embodiments. The user 1 (or the virtual community subscriber) may subscribe to and/or create a VP community 200 via the VP application server 20 and name the VP community 200 the Atlanta Braves baseball fan club. As non-limiting examples, the user 1 may input the triggering event as an Atlanta Braves baseball game. The triggering event is the shared social experience that may be simultaneously experienced (e.g., viewed and/or listened to) by members of the VP community 200.

In exemplary embodiments, the members of the Atlanta Braves fan baseball club may include the users 1, 2, 3, 4 who have been invited and accepted the invitation to participate in the VP community 200. As a non-limiting example, the VP community 200 may require a quorum of two members to be virtually present (e.g., viewing the Atlanta Braves baseball game) before invitations are sent out for social networking. If the virtual presence information for at least two members is transmitted to the VP data server 15 by the respective VP filter agents, after being detected using metadata filtering of the VP filter agent, the VP data server 15 updates the VP community list table and informs the VP application server 20 that the VP table has been updated. The two members are invited by the VP application server 20 to begin social networking, such as to join in a conference phone call (or text chat room) via the conference bridge server 25. If and when the metadata filtering of the VP filter agents of other members detect their virtual presence, e.g., viewing the Atlanta Braves baseball game, their respective VP filter agents transmit this virtual presence information to the VP data server 15, and the other members are invited to join in the conference call for the VP community 200 in accordance with exemplary embodiments. The members of the VP community 200 may simultaneously enjoy their content of interest (Atlanta Braves baseball game) while social networking via the communication method. Additionally, members of the VP community may periodically check the VP communities, such as the VP community 200, that they are interested in to inquire if members are virtually present. Also, the members may elect to receive notifications, such as emails, if a particular member(s) is virtually present. This may occur regardless of whether the member, inquiring about the status of other members, is virtually present and/or participating in the social networking.

FIG. 3 illustrates a non-limiting example of the virtual presence server table 300 in accordance with exemplary embodiments. The VP presence server table 300 may include a list of members, such as the users 1, 2, 3, 4 who have registered for a VP community, such as the VP community 200. The VP presence server table 300 may include the triggering event, which may be, e.g., the Atlanta Braves Baseball Game, and may include the name of the VP community 200, which may be the Atlanta Braves fan baseball club.

Additionally, the VP server table 300 may indicate whether social networking has occurred (e.g., has a conference call been initiated), and/or which members have joined in the conference call. It is understood that additional identifying information may be included in and associated with the VP server table 300 to facilitate the virtual presence service as discussed herein. As an option, a member may check with the VP server table 300 to inquire whether his or her friend has been detected as viewing the triggering event via the VP filter agent, and/or to inquire whether the friend has joined the social networking experience (e.g., whether the friend joined in the conference call) in exemplary embodiments.

Moreover, in exemplary embodiments, the member may manually indicate to the VP data server 15 that he or she is actually present (i.e., attending the Braves game in person), such that the member may be added to the social network to communicate with other members of the VP community that are virtually present. As non-limiting examples, the member may manually communicate to the VP data server 15 (without requiring the VP filter agent) by sending an email, placing a telephone call, accessing a web site of the VP service. After the VP service authenticates the member (e.g., verifies a username and/or password), the member may manually indicate that he or she is present for the VP community 200 and wishes to join the social network.

Figure 4:
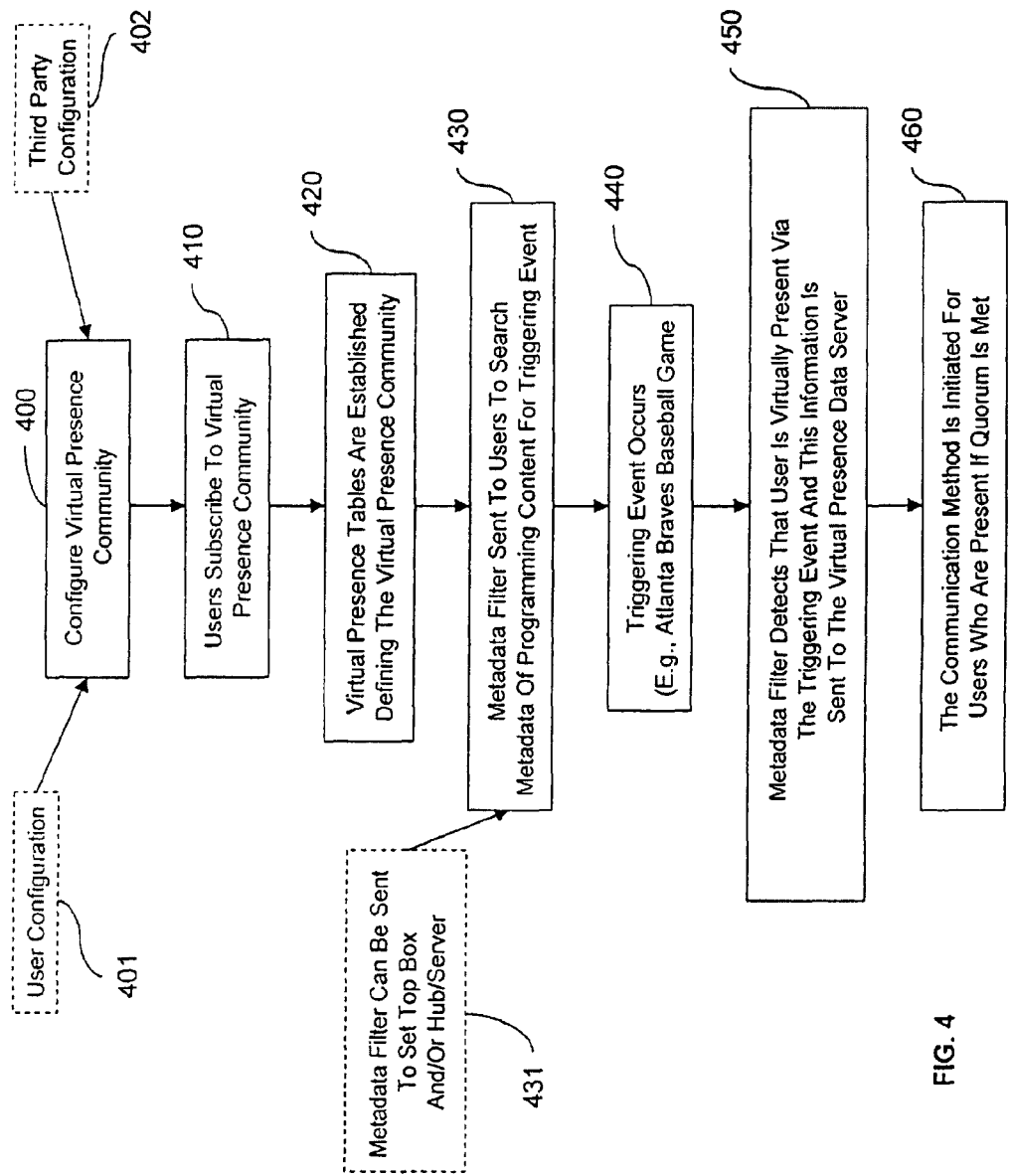
FIG. 4 illustrates a flow chart for a virtual presence community in accordance with exemplary embodiments.

FIG. 4 illustrates a flow chart for a virtual presence community in accordance with exemplary embodiments. As discussed herein, the VP service comprises the necessary infrastructure (e.g., the VP application server 20, VP data server 15, broadcast media source 10, conference bridge server 25). The VP community may be created by a user 401 and/or a third party 402 wishing to establish a VP community at 400. The third party 402 may be, e.g., a community organization, or a school that invites parents to join a VP community of parents viewing school plays. Users may subscribe to the VP service (e.g., on a PC using the Internet to connect to the VP application server 20), which may include input of their list of VP communities of interest at 410. As non-limiting examples, the user 401 may subscribe to the VP service (e.g., on a PC or the IPTV screen) and indicate a list of prospective members that she wishes to be invited to join the VP community (e.g., local branch of the Atlanta Braves baseball fan club).

The service provider (which may be the IPTV service provider) uses data collected during subscription to include in tables defining each VP community at 420. The service provider configures metadata filtering of the VP filter agent, e.g., on the set top box 45, to monitor program selections for metadata matches with the new VP community lists (note that such monitoring might already be in place if another member of the VP community is active) at 430. Metadata filtering may be configured to correspond with the particular VP community (e.g., with the VP community 200). The VP filter agent for metadata filtering may be transmitted, e.g., to the user's set top box 45 (from, e.g., the VP application server 20, VP data server 15, and/or broadcast media source 10) at 431.

The user 401 may view the Atlanta Braves baseball game, which is a triggering event in this non-limiting example at 440. The VP filter agent uses metadata filtering to capture the triggering event and transmit this information to the VP data server 15 at 450. The VP data server 15 updates the global VP community list table and alerts the VP application server 20 that the table has been updated if a quorum has been reached.

The VP application server 20 receives the update notification, and recognizes that a quorum (e.g., of two members) has now been met for the Atlanta Braves baseball fan club VP community. Based on stored user profile data, the VP application server 20 determines that the resulting social networking should be the initiation of a conference call at 460

Furthermore, the VP application server 20 may signal the conference bridge server 25 to set up a conference call. Meanwhile, the VP filter agent continues to monitor all members for updates that affect all of the VP communities, including the Atlanta Braves baseball fan club VP community.

Eventually, the program for the triggering event ends. The VP filter agent causes the VP community tables to be updated, and the VP application server 20 recognizes that the VP community should be disbanded, and signals the conference bridge server 25 to request user permission to tear down the call.

Although the certain functions and responsibilities have been designated to the VP application server 20, VP data server 15, broadcast media source 10, conference bridge server 25, and VP filter agent, it is contemplated that these functions and responsibilities may be combined and/or performed by more, fewer, or different servers and/or components. Indeed, the descriptions of functions and responsibilities discussed herein for the VP service are not meant to be limiting in any way, but are for explanatory purposes. Although the VP filter agent and the IPTV 40 are described with certain functions and responsibilities, the functions and responsibilities of one or both of these items may be combined into one item such as in the IPTV 40 or performed in a different device. It is understood that storage devices may be used in the VP service.

Figure 5:
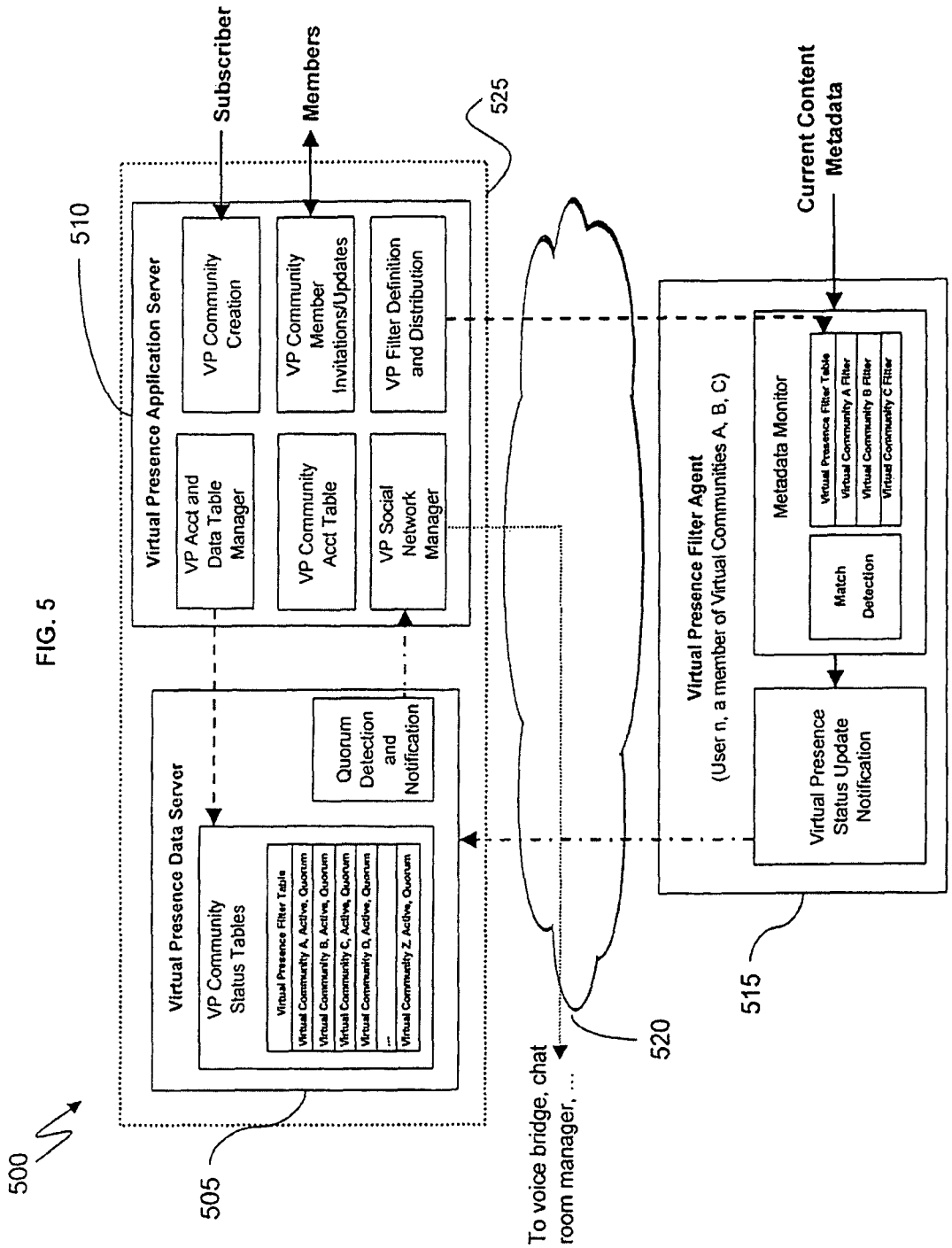
FIG. 5 illustrates a block diagram of a system for a virtual presence service in accordance with exemplary embodiments.

FIG. 5 illustrates a block diagram of a system 500 for a virtual presence service in accordance with exemplary embodiments. The system 500 may include a virtual presence data server 505, a virtual presence application server 510, a virtual presence filter agent 515, and a network 520.

The virtual presence data server 505 may include VP community status tables for all of the VP communities. The virtual presence application server 510 may include a VP community creation application that is configured to allow creation of VP communities and to receive subscriptions from users who desire to join the VP communities. A VP account manger may provide updates to the VP data server 505 regarding new and/or existing members and VP communities. According to exemplary embodiments, the VP application server 510 configures a VP filter definition that relates to the triggering event for each VP community and distributes the VP filter definition to the virtual presence filter agent 515 to monitor metadata of the members.

The VP filter agent 515 monitors the current content metadata of a user n, who may be a member of, e.g., VP communities A, B, C. According to exemplary embodiments, each VP community has its own VP filter definition that is utilized by the VP filter agent 515 to detect corresponding metadata. If the VP filter agent 515 detects a match of the metadata for a particular VP community, a status update notification is transmitted to the virtual presence data server 505 indicating that user n is virtually present for the VP community.

The VP data server 505 may recognize the virtually present status update and determines whether a quorum is met for the particular VP community. If the quorum is met for the VP community, the VP data server 505 notifies the VP application server. The VP application server extends invitations to join a social networking experience to the members of the VP community who a virtually present. If the members who are virtually present accept the invitations to join the social networking experience, a VP social network manager of the VP application server 510 initiates connection of the communication method specified for the VP community.

While exemplary embodiments have described shared social interactions (text or voice exchanges) while simultaneously viewing specific content for individuals who have a prearranged social contract (VP community), a wide range of other forms of (near) real time or deferred interactions are possible. These could include multimedia exchanges including video, establishing interactive games associated with the content being viewed, such as e.g., guessing or even wagering on "whodunit?" for a detective show before the ending, on who will win for an athletic event, or on which horse will win a given race before they enter the home stretch in accordance with exemplary embodiments.

The concept of virtual presence may include more than shared viewing of broadcast entertainment, e.g., being viewed on a TV. In exemplary embodiments, virtual presence may be any common activity, including all those individuals awaiting a particular flight in an airport, all theater goers holding tickets for an upcoming performance, everyone on the waiting list for a seat at a restaurant, and so forth. The only requirement is that there must be a means of detecting the state (present or not) of the individual and some means of supporting social interaction among those who have executed the needed social contract in exemplary embodiments.

Additionally, in exemplary embodiments, a limited VP community may further agree to be contacted by anyone "virtually present" in the defined context. As a non-limiting example, those waiting for tables at a restaurant could agree to communicate with others that are also waiting for tables, perhaps to negotiate agreement to share a larger table if one becomes available.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, and loaded into and/or executed by a computer, or transmitted over some transmission medium, loaded into and/or executed by a computer, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of providing a virtual presence service, the method comprising:
    configuring a virtual presence community of members;
    registering one of the members for the virtual presence community;
    configuring by a server a virtual presence filter definition of a filter that relates to a triggering event for the virtual presence community, the virtual presence filter definition being exclusive to the virtual presence community of the members;
    transmitting by the server the virtual presence filter definition of the filter to a set top box of the one of the members, the filter transmitted to the set top box being operative to detect the triggering event corresponding to the virtual presence community according to the virtual presence filter definition;
    wherein the filter monitors content viewing of the one of the members, the filter detecting the triggering event;
    wherein detecting the triggering event comprises the filter matching a predefined program via the set top box according to the virtual presence filter definition previously configured by the server;
    initiating communications in response to the filter on the set top box detecting the triggering event;
    receiving by the server update notifications from the filter of the members; and
    updating by the server a virtual presence community list table related to the filter upon receiving each of the update notifications from the filter of the members.

2. The method of providing the virtual presence service of claim 1, wherein the triggering event is media being received by the one of the members;
    wherein when a quorum is met in the virtual presence community list table, the server initiates a conference call for the members; and
    wherein another virtual presence community of other members has its own other virtual presence filter definition exclusive to the another virtual presence community.

3. The method of providing the virtual presence service of claim 1, wherein configuring the virtual presence community comprises receiving a name of the virtual presence community, receiving a communication method for the virtual presence community, receiving the triggering event for the virtual presence community, and receiving a quorum for the virtual presence community.

4. The method of providing the virtual presence service of claim 1, wherein registering the one of the members for the virtual presence community comprises:
receiving a name of the virtual presence community for the one of the members to join, and receiving a communication method for contacting the one of the members, wherein the communication method for contacting the one of the members comprises contacting by phone, by text message, by email, and by on-screen message; and
receiving and accepting an invitation to join the virtual presence community.

5. The method of providing the virtual presence service of claim 1, wherein the virtual presence filter definition of the filter monitors program selections on the set top box for metadata matches to the triggering event.

6. The method of providing the virtual presence service of claim 5, wherein a virtual presence component containing the filter is the server, a hub, and a network element.

7. The method of providing the virtual presence service of claim 1, wherein initiating the communication service comprises:
contacting the one of the members with an invitation to join a communications connection with the virtual presence community; and
establishing the communications connection with the one of the members and the virtual presence community in response to the one of the members accepting the invitation.

8. The method of providing the virtual presence service of claim 1, wherein the triggering event comprises consuming content corresponding to the virtual presence community.

9. The method of providing the virtual presence service of claim 1, further comprising receiving a manual request from the one of the members to establish communications with the virtual presence community.

10. The method of providing the virtual presence service of claim 1, wherein the filter detects the triggering event by filtering metadata of content being viewed by the one of the members.

11. A virtual presence service system, the system comprising:
a virtual presence server operative to create a virtual presence community of members;
wherein the virtual presence server configures a virtual presence filter definition of a virtual presence filter agent that relates to a triggering event for the virtual presence community, the virtual presence filter definition being exclusive to the virtual presence community of the members; and
the virtual presence filter agent operative to monitor metadata relating to the triggering event corresponding to the virtual presence community according to the virtual presence filter definition;
wherein the virtual presence server is operative to transmit the virtual presence filter definition of the virtual presence filter agent to a set top box of one of the members;
wherein the virtual presence filter agent monitors content viewing of the one of the members, the virtual presence filter agent detecting the triggering event;
wherein detecting the triggering event comprises the virtual presence filter agent matching a predefined program via the set top box according to the virtual presence filter definition configured by the virtual presence server;
wherein the virtual presence server receives triggering event information via the virtual presence filter agent of the set top box in response to the virtual presence filter agent detecting the triggering event;
wherein the virtual presence server initiates communications with the one of the members via a network;
wherein the virtual presence server receives update notifications from the virtual presence filter agent of the members; and
wherein the virtual presence server updates a virtual presence community table related to the virtual presence filter agent upon receiving each of the update notifications from the virtual presence filter agent of the members.

12. The system of claim 11, wherein the virtual presence server comprises a plurality of servers and devices.

13. The system of claim 11, wherein the virtual presence server is configured to create the virtual presence community by receiving a name of the virtual presence community, by receiving a communication method for the virtual presence community, by receiving the triggering event, and by receiving a quorum for the virtual presence community.

14. The system of claim 11, wherein the virtual presence server initiates communications by contacting the one of the members with an invitation to establish a communications connection with available members of the virtual presence community; and
wherein the virtual presence server establishes the communications connection with the one of the members and the available members of the virtual presence community in response to the one of the members accepting the invitation.

15. The system of claim 11, wherein the virtual presence server is configured to receive subscriptions to the virtual presence community for the one of the members, and wherein receiving subscriptions comprises:
receiving a name of the virtual presence community for the one of the members to join; and
receiving a communication method for contacting the one of the members, wherein the communication method for contacting comprises contacting the one of the members by phone, by text message, by email, and by on-screen message.

16. The system of claim 11, wherein the triggering event comprises consuming content corresponding to the virtual presence community.

17. A computer program product, tangibly embodied on a non-transitory computer readable medium, for providing a virtual presence service, the computer program product including instructions that, when executed by a computer, cause the computer to perform operations comprising:
configuring a virtual presence community of members;
registering one of the members for the virtual presence community;
configuring by a server a virtual presence filter definition of a filter that relates to a triggering event for the virtual presence community, the virtual presence filter definition being exclusive to the virtual presence community of the members;
transmitting by the server the virtual presence filter definition of the filter to a set top box of the one of the members, the filter transmitted to the set top box being operative to detect a triggering event corresponding to the virtual presence community according to the virtual presence filter definition;
wherein the filter monitors content viewing by the one of the members, the filter detecting the triggering event;

wherein detecting the triggering event comprises matching a predefined program via the set top box according to the virtual presence filter definition configured by the server;

initiating communications in response to detecting the triggering event;

receiving by the server update notifications from the filter of the members; and updating by the server a virtual presence community list table related to the filter upon receiving each of the update notifications from the filter of the members.

18. The computer program product of claim 17, wherein configuring the virtual presence community comprises receiving a name of the virtual presence community, receiving a communication method for the virtual presence community, receiving the triggering event for the virtual presence community, and receiving a quorum for the virtual presence community.

* * * * *